United States Patent
Holbach et al.

(10) Patent No.: US 6,778,919 B1
(45) Date of Patent: Aug. 17, 2004

(54) METHOD FOR IDENTIFICATION OF AN OSCILLATION IN AN ELECTRICAL POWER SUPPLY SYSTEM

(75) Inventors: Juergen Holbach, Nuenkirchen (DE); Andreas Jurisch, Schwante (DE); Volker Rissland, Marwitz (DE)

(73) Assignee: Siemens Aktiengesellschaft, Munich (DE)

( * ) Notice: Subject to any disclaimer, the term of this patent is extended or adjusted under 35 U.S.C. 154(b) by 45 days.

(21) Appl. No.: 10/089,550
(22) PCT Filed: Sep. 27, 2000
(86) PCT No.: PCT/DE00/03434
§ 371 (c)(1),
(2), (4) Date: Oct. 18, 2002
(87) PCT Pub. No.: WO01/24343
PCT Pub. Date: Apr. 5, 2001

(30) Foreign Application Priority Data

Sep. 30, 1999 (DE) ......................................... 199 48 694

(51) Int. Cl.⁷ ................................................. G01R 31/08
(52) U.S. Cl. ........................................ 702/59; 324/124
(58) Field of Search ..................... 702/59, 58; 324/142; 361/160, 92, 59, 196; 307/105

(56) References Cited

U.S. PATENT DOCUMENTS

| | | | | | |
|---|---|---|---|---|---|
| 4,176,388 A | * | 11/1979 | Palmer | ..................... | 361/196 |
| 4,183,071 A | * | 1/1980 | Russell | ..................... | 361/59 |
| 4,205,361 A | * | 5/1980 | Shimp | ..................... | 361/92 |
| 4,591,992 A | * | 5/1986 | Yamaura | ..................... | 702/59 |
| 6,104,182 A | * | 8/2000 | Jurisch et al. | ..................... | 324/142 |
| 6,175,810 B1 | * | 1/2001 | Jurisch | ..................... | 702/58 |
| 6,208,497 B1 | * | 3/2001 | Seale et al. | ..................... | 361/160 |
| 6,476,521 B1 | * | 11/2002 | Lof et al. | ..................... | 307/105 |

FOREIGN PATENT DOCUMENTS

| | | | | |
|---|---|---|---|---|
| DE | 41 00 646 A1 | 9/1992 | ............ | H02H/7/26 |
| DE | 195 03 626 A1 | 8/1996 | ............ | H02H/7/26 |
| DE | 197 46 719 C1 | 5/1999 | ............ | H02J/7/26 |
| EP | 0 724 319 A2 | 7/1996 | ............ | H02J/3/24 |

* cited by examiner

Primary Examiner—John Barlow
Assistant Examiner—Victor J. Taylor
(74) Attorney, Agent, or Firm—Morrison & Foerster LLP (57) ABSTRACT

The invention relates to a method for producing at least one signal (oscillation signal), which indicates an oscillation in an electrical power supply system. In order to allow the oscillation behavior of an electrical power system to be detected safely and reliably at all times, an oscillation model is used which is formed from previous impedance values associated with the oscillation, or from variables dependent on these impedance values. A check is carried out to determine whether a further impedance value formed at that time or a variable which is dependent on this further impedance value differs from the oscillation model, and any occurrence of a further impedance value or of a variable dependent on this impedance value which differs from the oscillation model is assessed as the oscillation having stopped.

11 Claims, 5 Drawing Sheets

METHOD FOR IDENTIFICATION OF AN OSCILLATION IN AN ELECTRICAL POWER SUPPLY SYSTEM

CLAIM FOR PRIORITY

This application claims priority to International Application No. PCT/DE00/03434 which was filed in the German language on Sep. 27, 2000.

TECHNICAL FIELD OF THE INVENTION

The invention relates to a method for producing at least one signal (oscillation signal), which indicates an oscillation in an electrical power supply system.

BACKGROUND OF THE INVENTION

German Laid-Open Specification DE 195 03 626 A1 describes a method of identifying an oscillation. In this method, once a memory element has been set, further impedance values are checked to determine whether the oscillation that has been found is still continuing, by determining the rate of change of the magnitude of respectively successive impedance values. If it is found that the rate of change is above a limit value, this identifies that the oscillation has stopped, and the memory element is reset. It is difficult to define such a limit value, particularly when a large number of generators are connected in the power supply networks, and complex oscillations can thus occur.

SUMMARY OF THE INVENTION

The invention relates to a method for producing at least one signal (oscillation signal), which indicates an oscillation in an electrical power supply system, in which method the phase current and the phase voltage are in each case sampled from at least one phase of the power supply system, forming phase current and phase voltage sample values, impedance values are formed from the phase current and phase voltage sample values, the impedance values are monitored for the presence of any oscillation and, if an oscillation is identified, at least one memory element is set, and the oscillation signal is output at its output, after setting the memory element, further impedance values are checked to determine whether the oscillation that has been found is still continuing, the memory element remains uninfluenced if the oscillation continues, and the memory element is reset if the oscillation has stopped.

The invention specifies a method of detecting the oscillation behavior of an electrical power supply system in a safe and reliable manner.

In one embodiment of the invention, there is a method that checks the impedance values and makes use of an oscillation model which is formed from previous impedance values associated with the oscillation, or is from variables which are dependent on these impedance values. A check is then carried out to determine whether a further impedance value formed at that time or a variable which is dependent on the further impedance value differs from the oscillation model, and any occurrence of a further impedance value or of a variable dependent on this impedance value which differs from the oscillation model is assessed as the oscillation having stopped.

One advantage of the method according to the invention is that the oscillation model allows even complex oscillations to be described, and it is thus possible to identify that the oscillation has stopped with a high level of reliability even in the case of such complex oscillations The oscillation model can advantageously be determined by means of a least squares estimation method. This estimation method allows a mathematical oscillation model to be produced from successive impedance values which have been formed after the setting of the memory element, that is to say after the start of the oscillation.

A function in the form $f(x)=ax^3+bx^2+cx+d$ with the parameters a, b, c and d can be used as the model rule or the oscillation model, in which one or more parameters can be defined to be zero before the start of the estimation method. First, second or third order power functions can be used as the model rule. Furthermore, a sum of sine and cosine functions, which decay with time, can be used as the model rule for the oscillation model. These model rules make it possible to describe even complex oscillations mathematically.

The oscillation model can be formed directly for the determined impedance values of the oscillation, or else for variables dependent on these impedance values. Resistance values. R, reactance values X, time derivative values $dZ/dt$ of the impedance, time derivative values $dR/dt$ of a resistance or time derivative values $dX/dt$ of a reactance can be used as dependent variables. Choice of the most suitable variable for the oscillation model makes it possible to determine with a high level of reliability that the oscillation has stopped, with the choice of the variable being dependent on the individual system configuration of the electrical power supply system.

In one advantageous embodiment of the invention, positive phase sequence system impedance values can be formed from the phase current and phase voltage sample values, and a common memory element can be provided, and a common oscillation signal can be produced, for the phases in the power supply system. This variant can be used when the aim is to make a statement relating to any oscillation occurring at the same time in all the phases in the power supply system.

In a further embodiment of the method according to the invention, phase impedance values are formed from the phase current and phase voltage sample values of each phase of the power supply system to be investigated for oscillation, and a dedicated memory element is provided, and a dedicated oscillation signal is produced, for each of these phases. In this embodiment, the oscillation response of each individual phase in the power supply system can be investigated separately. That is, both the starting and the stopping of an oscillation are identified. This is particularly advantageous when oscillations occur in a single phase, but not in all the phases, in the power supply system. Oscillations such as these frequently occur in the case of so-called single-pole pauses in high-voltage systems. Single-pole pauses are produced by single-pole conductor ground faults, which can be expected frequently in high-voltage systems, and in which an arc is struck between one conductor and ground. In this type of fault, a single-pole pause is produced. That is, the single phase in which the single-pole conductor-ground fault has occurred is switched off briefly. The arc is thus quenched, and the fault is frequently corrected. Switching off a single pole of one phase can result in oscillations occurring in the remaining phases which are not switched off. These oscillations cannot be identified, for example, by monitoring the positive phase sequence system impedance values, since positive phase sequence system impedance values are formed when sample values are available for the phases in the power supply system. In the case of a single-pole pause, it is advantageous to be able to produce a dedicated oscillation signal for each phase in the power supply system. During the single-pole pause, this oscillation signal is produced for those phases which are not switched off. The oscillation behavior of the power supply system can thus be determined individually for each phase, and independently of the state of the other phases.

The phase impedance values of the individual phases in the electrical power supply system can, for example, be formed by, in order to form the phase impedance values, a variable $U\_re$ including the real part of the phase voltage sample values, a variable $U\_im$ including the imaginary part of the phase voltage sample values, a variable $I\_re$ including the real part of the phase current sample values and a variable $I\_im$ including the imaginary part of the phase current sample values being formed from the phase current and phase voltage sample values (i, u) for each phase, a phase real power variable P being determined from $P = U\_re \cdot I\_re - U\_im \cdot I\_im$, a phase wattless component variable Q being determined from $Q = U\_im \cdot I\_re + U\_im \cdot I\_re$, a squared phase current amplitude variable $I^2$ being determined from $I^2 = I\_re \cdot I\_re + I\_im \cdot I\_im$, system-frequency components in each case being removed by means of least squares estimation method from the phase real power variable P, from the phase wattless component variable Q and from the squared phase current amplitude variable $I^2$, and phase resistance values R being determined from $R = P/I^2$ and phase reactance values, X being determined from $X = Q/I^2$, and phase impedance values $Z = R + jX$ being thus determined.

When forming the phase impedance values, it is advantageous to remove the system frequency components (for example 50 Hz components) from the phase real power variable P, from the phase wattless component variable Q and from the squared phase current amplitude variable $I^2$ by means a least squares estimation method in each case. Such system frequency interference components would adversely affect the evaluation of the phase impedance values determined from these variables.

BRIEF DESCRIPTION OF THE DRAWINGS

In order to explain the invention further.

DETAILED DESCRIPTION OF THE PREFERRED EMBODIMENT

Figure 1:
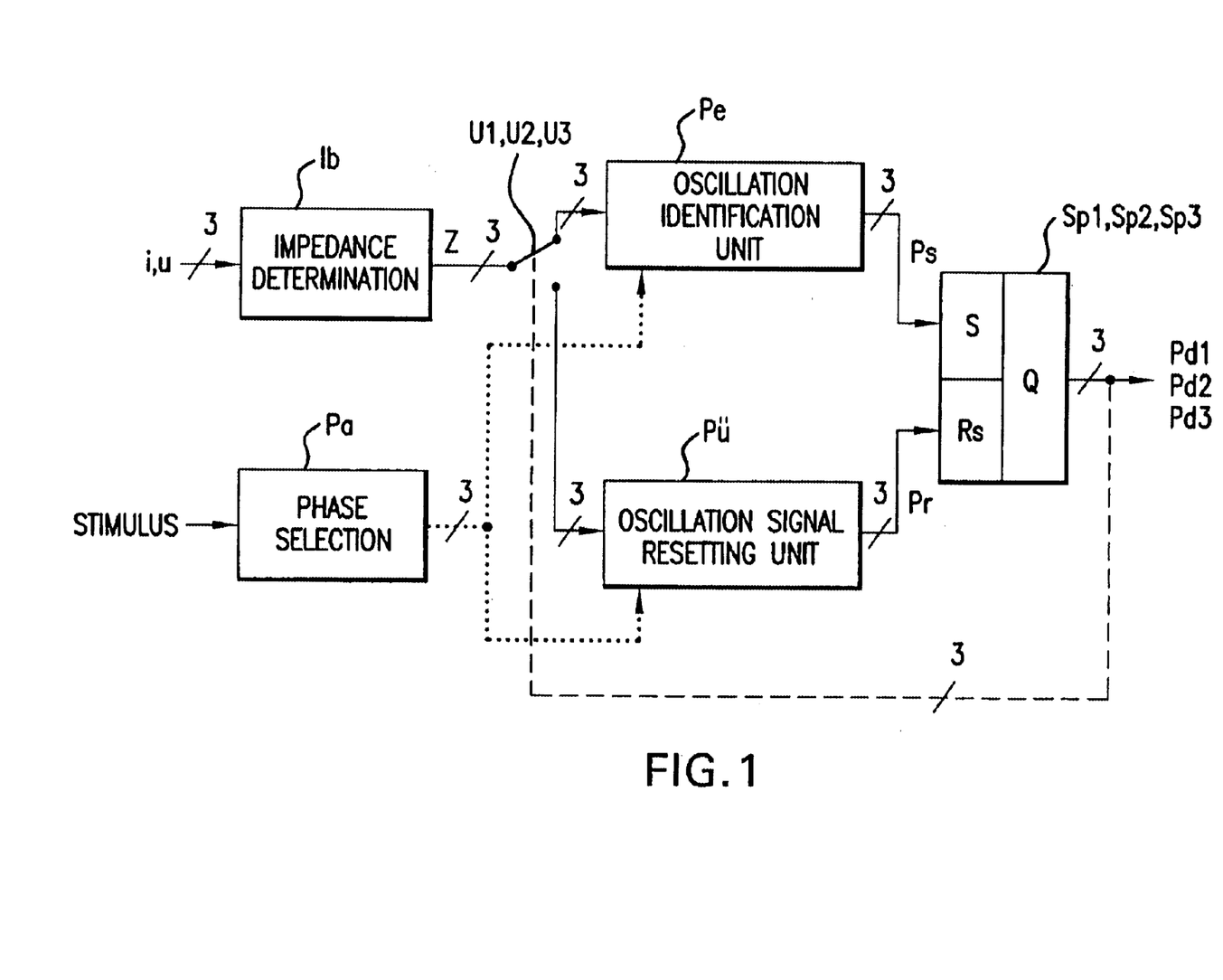
FIG. 1 shows a block diagram of an exemplary embodiment of the method according to the invention.

FIG. 1 shows, schematically, a method for determining the oscillation behavior of a three-phase electrical power supply system, by means of which a dedicated oscillation signal Pd1, Pd2 and Pd3 is produced for each phase in the power supply system. This is done by providing three changeover switches U1, U2 and U3 and three memory elements Spi, Sp2 and Sp3. The connecting lines between the individual units in the layout are designed with three poles. The phase current and phase voltage sample values i and u of all three phases are supplied to a unit for impedance determination Ib, at whose output phase impedance values Z are output for the three phases. These phase impedance values Z are supplied via the changeover switches U1, U2 and U3 to an oscillation identification unit Pe. The oscillation identification unit Pe uses the time profiles of the phase impedance values Z to identify the occurrence of any oscillation in the individual phases, for example in phase 1, and emits an oscillation set signal Ps at its output for each phase in which oscillation is identified, for example for the phase 1. The oscillation set signal Ps sets the memory element associated with the respective phase, for example Sp1, and this memory element emits at its output the phase-specific oscillation signal, for example, Pd1. When an oscillation signal is being emitted, for example the oscillation signal Pd1, the changeover switch, for example U1, associated with the respective phase is switched over. The phase impedance values Z which are still formed for the phase in which the oscillation has been identified, for example the phase 1, are supplied to an oscillation signal resetting unit Pü. This oscillation signal resetting unit Pü identifies that the oscillation has stopped and, in this case, emits an oscillation reset signal Pr at its output, which resets the memory element for the respective phase, for example Sp1. The oscillation signal for the respective phase, for example Pd1, is thus also no longer emitted, and the respective changeover switch, for example U1, moves back to its original position once again. In response to a stimulus, a unit for phase selection Pa ensures that the phase impedance values of the phases to be investigated for oscillation are in each case processed by the oscillation identification unit Pe and by the oscillation signal resetting unit Pü.

The method of operation of the four units comprising impedance determination Ib, the oscillation identification unit Pe, the oscillation signal resetting unit Pü and phase selection Pa will be explained in more detail in the following text.

Figure 2:
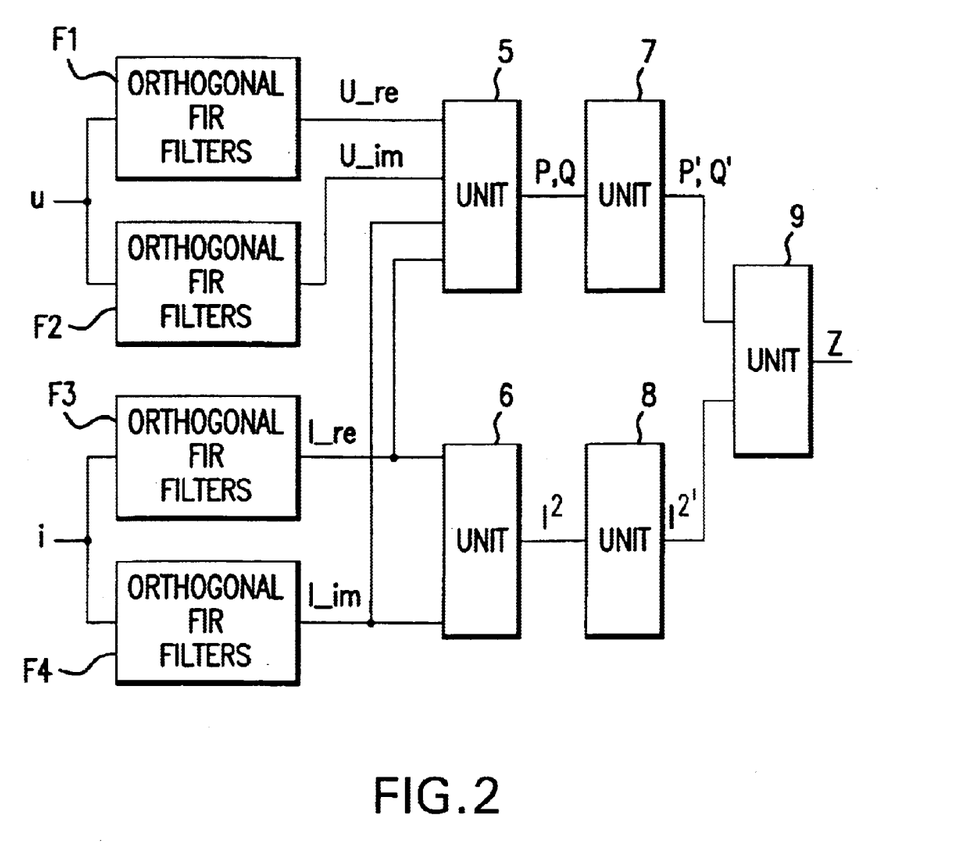
FIG. 2 shows a block diagram for determining the phase impedance values.

As shown in FIG. 2, the phase current and phase voltage sample values i and u are filtered in the impedance determination unit Ib by means of orthogonal FIR filters F1, F2, F3 and F4, thus resulting in the production of a variable $U\_re$ containing the real part of the phase voltage sample values, a variable $U\_im$ containing the imaginary part of the phase voltage sample values, a variable $I\_re$ containing the real part of the phase current sample values, and the variable $I\_im$ containing the imaginary part of the phase current sample values.

Figure 3:
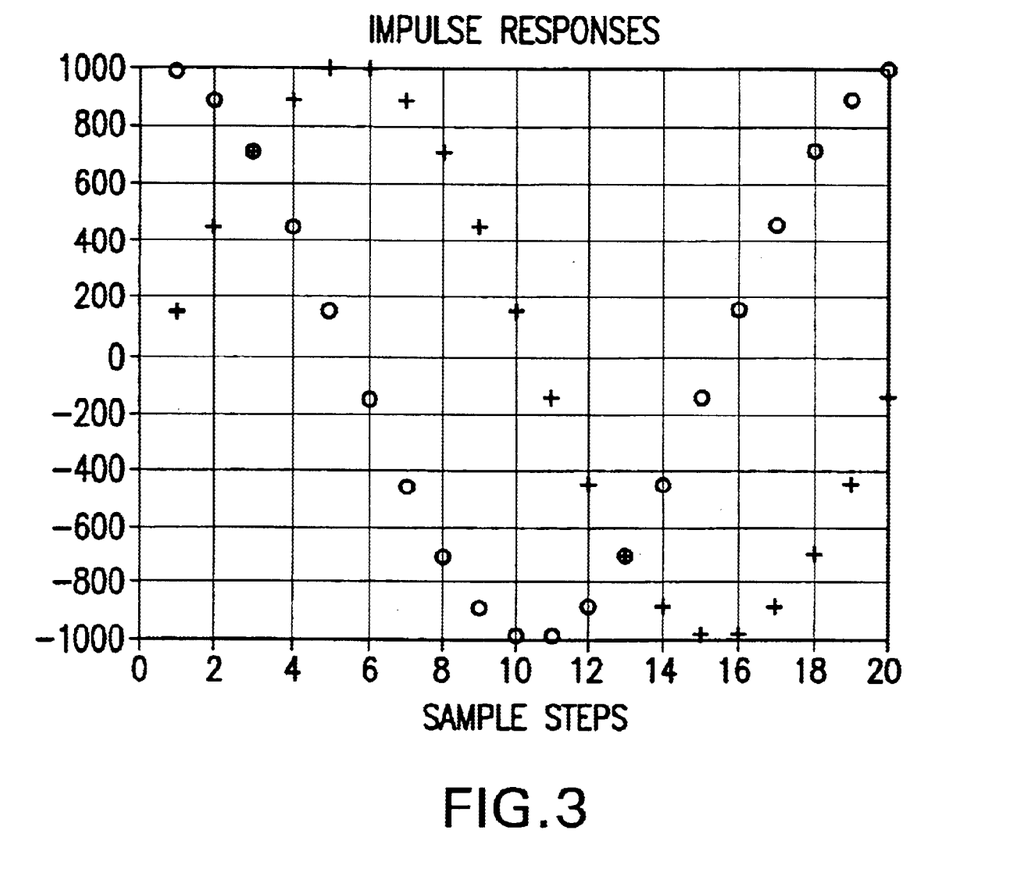
FIG. 3 shows the impulse response of the filters used for impedance determination.

FIG. 3 shows the impulse responses of the filters F1 to F4, with the impulse response of the filters F1 and F3 which determine the real parts being annotated "o", and the impulse response of the filters F2 and F4 which determine the imaginary parts, being annotated "+".

As shown in FIG. 2, following this, a phase real power variable P is calculated in accordance with equation (1) below and a phase wattless component variable Q is calculated in accordance with equation (2) in the unit 5, and a squared phase current amplitude variable $I^2$ is calculated in accordance with equation (3) in the unit 6.

$$P = U\_re \cdot I\_re - U\_im \cdot I\_um \tag{1}$$

$$Q = U\_im \cdot I\_re + U\_im \cdot I\_re \tag{2}$$

$$I^2 = I\_re \cdot I\_re + I\_im \cdot I\_im \tag{3}$$

After this, the phase real power variable P, the phase wattless component variable Q and the squared phase current amplitude variable I² are filtered in units 7 and 8 in order to remove the interference 50 Hz components contained in these variables; this results in the filtered variables P', Q' and I²'. The least squares estimation method used for this filtering will be explained in detail further below.

Figure 4A:
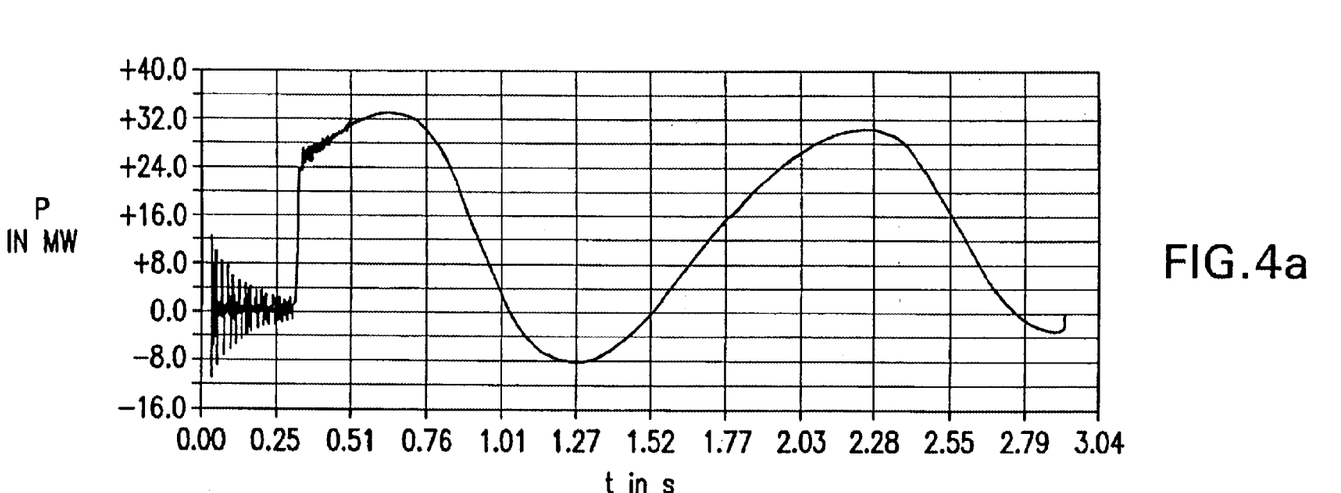
FIG. 4 shows the real power and wattless component variable profiles before filtering.
Figure 4B:
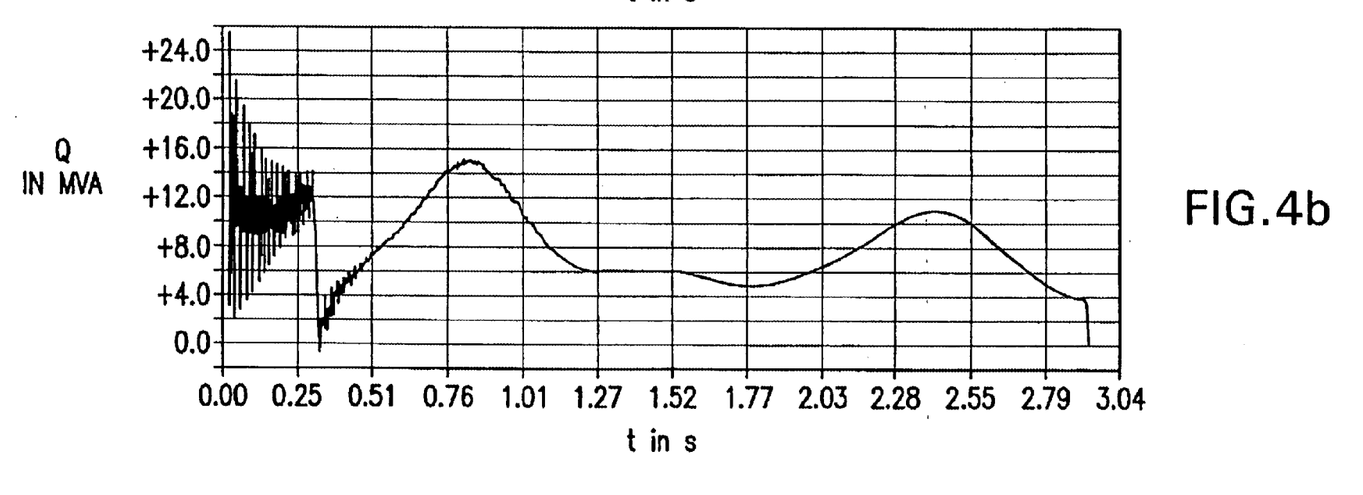

The upper illustration a) in FIG. 4 shows the profile of the real power variable P, and the lower illustration b) shows the profile of the Wattless component variable Q, before filtering by means of the least squares estimation method, in each case plotted against the time t.

Figure 5A:
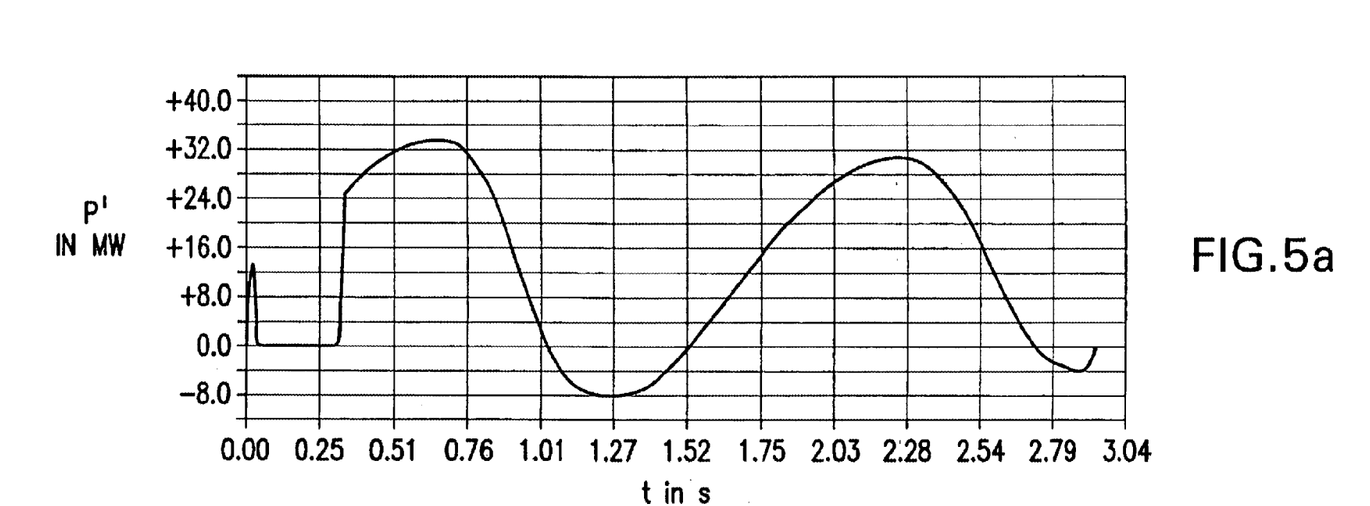
FIG. 5 shows the real power and wattless component variable profiles after filtering.
Figure 5B:
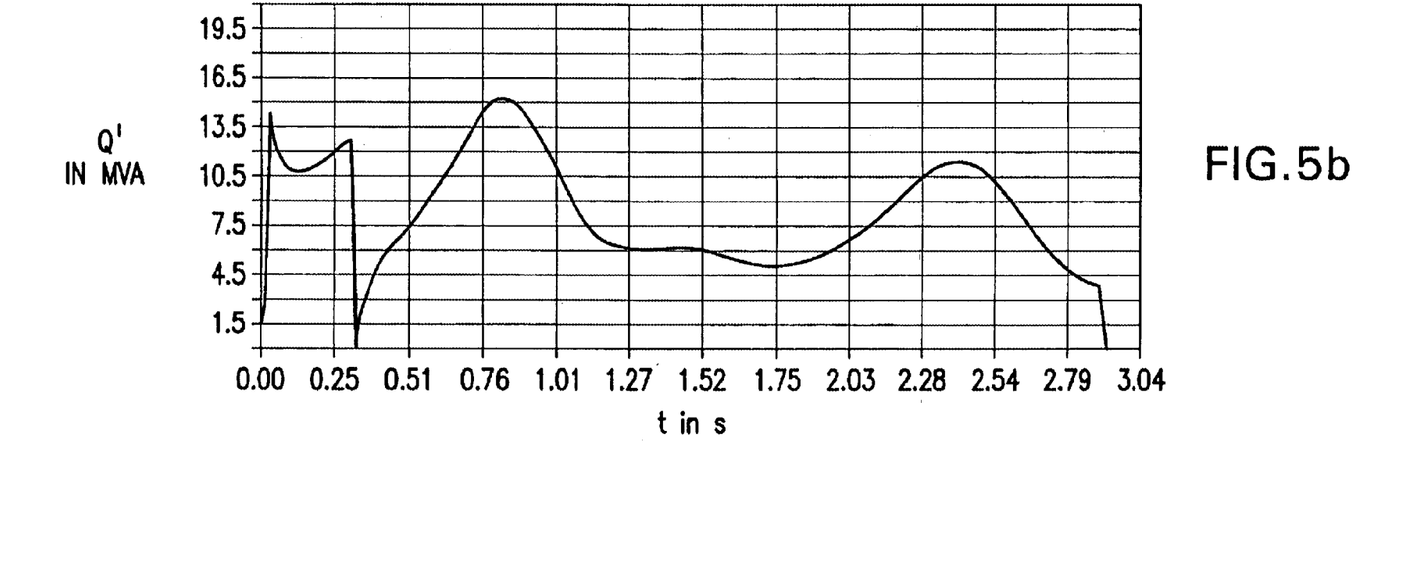

The upper illustration a) in FIG. 5 shows the profile of the real power variable P', and the lower illustration b) shows the profile of the Wattless component variable Q', after filtering by means of the least squares estimation method. It can clearly be seen that the 50 Hz components have been removed.

As shown in FIG. 2, after the filtering in the unit 9, phase resistance values R and phase reactance values X are determined in accordance with equation (4), and the phase impedance values Z=R+jX determined from them are emitted at the output of the impedance determination unit Ib.

$$R = P'/I^{2'} \quad X = Q'/I^{2'} \tag{4}$$

A least squares estimation method using a signal model in accordance with equation (5) is applied separately to each of the variables P, Q and I² in order to filter out the 50 Hz components included in the phase real power variable P, in the phase Wattless component variable Q and in the squared phase current amplitude variable I².

$$y_k = A \cdot e^{\frac{t}{\tau}} \cdot \sin(\omega_0 k \cdot T_A) + B \cdot e^{\frac{t}{\tau}} \cdot \cos(\omega_0 k \cdot T_A) + C \tag{5}$$

The estimation method uses the squared phase current amplitude variable I², the phase real power variable P and the phase Wattless component variable Q to calculate the parameters A, B and C in the signal model. The parameter C gives the sought magnitude of the phase real power variable P', of the phase Wattless component variable Q' and of the squared phase current amplitude variable I²'. The summands with the parameters A and B model the 50 Hz components. The variable ω0 is the frequency (50 Hz) to be filtered out, and $T_A$ is the sampling time.

If an equivalent circuit with two generator machines at the ends of a power transmission line is considered for the power supply system, the amplitude of the 50 Hz components decays with the time constants τ of the sum impedance between the two generator machines in accordance with equation (6), where L is the loop inductance and R is the loop resistance of the circuit which is closed via the two generator machines.

$$\tau = \frac{\sum L}{\sum R} \tag{6}$$

The coefficients A, B and C are determined such that the sum of the squares of the errors between values y determined from the phase current and phase voltage sample values i and u and the sample values yk calculated in accordance with equation (5) becomes a minimum (see equation (7)).

$$J = \sum_{i=k-N}^{k} (y_i - h(\underline{\Theta}_k))^2 \rightarrow \text{MIN} \tag{7}$$

In equation (7), J represents the Q-criterion to be minimized. The signal model included in equation (5) is used as the function h ($\Theta_k$). The parameters A, B and C to be determined form a vector $\Theta_k$ in accordance with equation (8).

$$\underline{\Theta}_k = \begin{pmatrix} A \\ B \\ C \end{pmatrix} \tag{8}$$

The Q-criterion J is derived based on the parameter vector $\Theta_k$ in order to solve the minimization task. For the signal model in accordance with equation (5), this then results in equation (9) together with equation (10).

$$0 = \sum_{i=k-N}^{k} 2\underline{\gamma}_i^T (y_i - \underline{\gamma}_i \underline{\Theta}_k) \tag{9}$$

$$\underline{\gamma}_i^k = \frac{\partial h}{\partial \Theta_k} \underline{\gamma}_i^k = \begin{pmatrix} \sin\left(\frac{2\pi}{T} iT_A\right) \cdot e^{\frac{iT_A}{\tau}} \\ \cos\left(\frac{2\pi}{T} iT_A\right) \cdot e^{\frac{iT_A}{\tau}} \\ 1 \end{pmatrix} \tag{10}$$

If equation (9) is solved for the vector $\Theta_k$, then this results in equation (11), by means of which, and using the matrix $S_k$ included in equations (12) and (13), the vector $\Theta_k$ is determined.

$$\underline{\Theta}_k = \underline{S}_k^{-1} \sum_{i=k}^{k} \underline{\gamma}_i^T y_i \tag{11}$$

$$\underline{S}_k = \sum_{i=k-N}^{k} \underline{\gamma}_i^T \underline{\gamma}_i \tag{12}$$

$$\underline{S}_k = \begin{pmatrix} \sin^2\left(\frac{2\pi}{T}iT_A\right)\cdot e^{-\frac{iT_A}{\tau}} & \sin\left(\frac{2\pi}{T}iT_A\right)\cos\left(\frac{2\pi}{T}iT_A\right)\cdot e^{-\frac{iT_A}{\tau}} & \sin\left(\frac{2\pi}{T}iT_A\right)\cdot e^{-\frac{iT_A}{\tau}} \\ \cos\left(\frac{2\pi}{T}iT_A\right)\sin\left(\frac{2\pi}{T}iT_A\right)\cdot e^{-\frac{iT_A}{\tau}} & \cos^2\left(\frac{2\pi}{T}iT_A\right)\cdot e^{-\frac{iT_A}{\tau}} & \cos\left(\frac{2\pi}{T}iT_A\right)\cdot e^{-\frac{iT_A}{\tau}} \\ \sin\left(\frac{2\pi}{T}iT_A\right)\cdot e^{-\frac{iT_A}{\tau}} & \cos\left(\frac{2\pi}{T}iT_A\right)\cdot e^{-\frac{iT_A}{\tau}} & 1 \end{pmatrix} \tag{13}$$

Of the parameters A, B and C included in the vector $\Theta_k$, only the parameter C is evaluated. The vectors $\gamma_i^k$ in accordance with equation (10) and the matrix $S_k$ in accordance with equation (13) are calculated and are stored as constants, so that they are available when the method is used.

Monotony criteria are applied to the locus curves of the impedance values in the impedanceplane in the oscillation identification unit Pe, in order to identify the oscillation process. This method for identification of the oscillation process is described in German Patent DE 197 46 719 C1.

The oscillation signal resetting unit $\overline{Pu}$ determines whether an oscillation which has already been identified is still continuing. The procedure used for this purpose comprises the production of an oscillation model for phase impedance values Z associated with the oscillation. A check is then carried out to determine whether the locus curve which is described by the newly determined phase impedance values Z still corresponds to the oscillation model. When producing the oscillation model, it is assumed that the locus curve is free of discontinuities, and that its direction changes slowly. In the present exemplary embodiment, the locus curve is described by a first order power function, that is to say by a linear equation, in accordance with equation (14).

$$X(R) = m \cdot R + X_0 \tag{14}$$

The parameters m and X0 are determined by means of a non-recursive least squares estimation method from the last N determined phase impedance values Z.

The linear equation is used as a model rule for the least squares estimation method, with the parameter m characterizing the gradient, and the parameter X0 characterizing the offset of the linear equation. The parameters m and X0 for the model in accordance with equation (14) are determined from the last determined value pairs (Ri, Xi) of the phase impedance values Zi such that the sum of the squares of the errors between the values Xi determined from the measured phase current and phase voltage sample values i and u and the values X calculated in accordance with equation (14) is a minimum (see equation (15)).

$$J = \sum_{i=k-N}^{k} (X_i - h(\Theta_k))^2 \to \text{MIN} \tag{15}$$

In equation (15), J is the Q-criterion to be minimized, the model rule in accordance with equation (14) is used as the function $h(\Theta_k)$. In accordance with equation (16), the parameter vector $\Theta_k$ contains the parameters m and X0, to be determined, from the model rule.

$$\underline{\Theta}_k = \begin{pmatrix} m \\ X_0 \end{pmatrix} \tag{16}$$

In order to solve the minimization task, the Q-criterion J is derived on the basis of the parameter vector $\Theta_k$. The following equations (17) and (18) are then obtained for the signal model in accordance with equation (14).

$$0 = \sum_{i=k-N}^{k} 2\underline{\gamma}_i^T (X_i - h(\underline{\Theta}_k)_i) \tag{17}$$

-continued $$\underline{\gamma}_i^k = \frac{\partial h}{\partial \Theta_k} = \begin{pmatrix} R \\ 1 \end{pmatrix} \tag{18}$$

If equation (17) is solved for the parameter vector $\Theta_k$, then this results in equation (19) for determining the parameter vector $\Theta_k$.

$$\underline{\Theta}_k = \underline{S}_k^{-1} \sum_{k=1}^{k} \underline{\gamma}_i^T y_i \tag{19}$$

where $$\underline{S}_k = \sum_{i=k-N}^{k} \underline{\gamma}_i^T \underline{\gamma}_i \tag{20}$$

$$\underline{S}_k = \sum_{i=k-N}^{k} \begin{pmatrix} R_i^2 & R_i \\ R_i & 1 \end{pmatrix} \tag{21}$$

After substitution of the parameters in equation (14), this results in the estimated oscillation model. If a newly determined phase impedance value Z corresponds to the oscillation model. That is, it is within a tolerance band around the linear equation represented by equation (14), then this identifies that the oscillation is continuing. If the newly determined phase impedance value Z is outside the tolerance band, then this identifies that the oscillation has stopped, and an oscillation reset signal Pr is emitted at the output of the oscillation signal resetting unit $\overline{Pu}$ for the memory element Sp1, Sp2 or, Sp3 for the respective phase.

The phase selection unit Pa receives a stimulus from, for example, a distance protection device which is not illustrated. Depending on the nature of the stimulated loop, it determines the phases for which the oscillation identification unit Pe and/or the oscillation signal resetting unit $\overline{Pu}$ should investigate the oscillation behavior. The following table shows the association between the stimulated loops and the phases.

| Stimulated loops | Phases to be investigated for oscillation behavior |
| --- | --- |
| L1E | L1 |
| L2E | L2 |
| L3E | L3 |
| L12 | L1 and L2 |
| L23 | L2 and L3 |
| L31 | L1 and L3 |

Description

Method for identification of an oscillation in an electrical power supply system The invention relates to a method for producing at least one signal (oscillation signal), which indicates an oscillation in an electrical power supply system, in which method the phase current and the phase voltage are in each case sampled from at least one phase of the power supply system, forming phase current and phase voltage sample values, impedance values are formed from the phase current and phase voltage sample values, the impedance values are monitored for the presence of any oscillation and, if an oscillation is identified, at least one memory element is set, and the oscillation signal is output at its output, after setting the memory element, further impedance values are checked to determine whether the oscillation that has been found is still continuing, the memory element remains uninfluenced if the oscillation continues, and the memory element is reset it the oscillation has stopped.

A method such as this is described in German Laid-Open Specification DE 195 03 626 A1. In this, method, once the memory element has been set, further impedance values are checked to determine whether the oscillation that has been found is still continuing, by determining the rate of change of the magnitude of respectively successive impedance values and, if it is found that the rate of change is above a limit value, this identifies that the oscillation has stopped, and the memory element is reset. It has been found to be difficult to define such a limit value, particularly when a large number of generators are connected in the power supply networks, and complex oscillations can thus occur.

The invention is based on the object of specifying a method by means of which the oscillation behavior of an electrical power supply system can be detected safely and reliably at all times.

For a method of the type mentioned initially, this object is achieved according to the invention in that the check of the further impedance values makes use of an oscillation model which is formed from previous impedance values associated with the oscillation, or from variables which are dependent on these impedance values; a check is then carried out to determine whether a further impedance value formed at that time or a variable which is dependent on this further impedance value differs from the oscillation model, and any occurrence of a further impedance value or of a variable dependent on this impedance value which differs from the oscillation model is assessed as the oscillation having stopped.

One major advantage of the method according to the invention is that the oscillation model allows even complex oscillations to be described, and it is thus possible to identify that the oscillation has stopped with a high level of reliability even in the case of such complex oscillations.

The oscillation model can advantageously be determined by means of a least squares estimation method. This estimation method allows a mathematical oscillation model to be produced from successive impedance values which have been formed after the setting of the memory element, that is to say after the start of the oscillation.

A function in the form $f(x)=ax^3+bx^2+cx+d$ with the parameters a, b, c and d can be used as the model rule for this oscillation model, in which one or more parameters can be defined to be zero before the start of the estimation method. First, second or third order power functions can thus be used as the model rule. Furthermore, a sum of sine and cosine functions, which decay with time, can be used as the model rule for the oscillation model. These model rules make it possible to describe even complex oscillations mathematically.

The oscillation model can be formed directly for the determined impedance values of the oscillation, or else for variables dependent on these impedance values. Resistance values R, reactance values X, time derivative values dZ/dt of the impedance, time derivative values dR/dt of a resistance or time derivative values dX/dt of a reactance can be used as dependent variables. Choice of the most suitable variable for the oscillation model makes it possible to determine with a high level of reliability that the oscillation has stopped, with the choice of the variable being dependent on the individual system configuration of the electrical power supply system.

In one advantageous embodiment of the invention, positive phase sequence system impedance values can be formed from the phase current and phase voltage sample values, and a common memory element can be provided, and a common oscillation signal can be produced, for all the phases in the power supply system. This variant can be used when the aim is to make a statement relating to any oscillation occurring at the same time in all the phases in the power supply system.

In a further advantageous embodiment of the method according to the invention, phase impedance values are formed from the phase current and phase voltage sample values of each phase of the power supply system to be investigated for oscillation, and a dedicated memory element is provided, and a dedicated oscillation signal is produced, for each of these phases. In this embodiment, the oscillation response of each individual phase in the power supply system can be investigated separately, that is to say both the starting and the stopping of an oscillation are identified. This is particularly advantageous when oscillations occur in only a single phase, but not in all the phases, in the power supply system. Oscillations such as these frequently occur in the case of so-called single-pole pauses in high-voltage systems. Single-pole pauses are produced by single-pole conductor ground faults, which can be expected frequently in high-voltage systems, and in which an arc is struck between one conductor and ground. In this type of fault, a single-pole pause is produced that is to say the single phase in which the single-pole conductor-ground fault has occurred is switched off briefly. The arc is thus quenched, and the fault is frequently corrected. Switching off a single pole of one phase can result in oscillations occurring in the remaining phases which are not switched off. These oscillations cannot be identified, for example, by monitoring the positive phase sequence system impedance values, since positive phase sequence system impedance values can be formed only when sample values are available for all the phases in the power supply system. In the case of a single-pole pause, it is now highly advantageous to be able to produce a dedicated oscillation signal for each phase in the power supply system; during the single-pole pause, this oscillation signal is produced only for those phases which are not switched off. The oscillation behavior of the power supply system can thus be determined individually for each phase, and independently of the state of the other phases.

The phase impedance values of the individual phases in the electrical power supply system can, for example, be formed by, in order to form the phase impedance values, a variable U_re containing the real part of the phase voltage sample values, a variable U_im containing the imaginary part of the phase voltage sample values, a variable I_re containing the real part of the phase current sample values and a variable I_im containing the imaginary part of the phase current sample values being formed from the phase current and phase voltage sample values (i, u) for each phase, a phase real power variable P being determined from P=U_re·I_re−U_im·I_im a phase wattless component variable Q being determined from Q=U_im·I_re+U_im·I_re a squared phase current amplitude variable $I^2$ being determined from $I^2$=I_re·I_re+I_im·I_im system-frequency components in each case being removed by means of least squares estimation method from the phase real power variable P, from the phase wattless component variable Q and from the squared phase current amplitude variable $I^2$, and phase resistance values R being determined from $R=P/I^2$ and phase reactance values X being determined from $X=Q/I^2$, and phase impedance values $Z=R+jX$ being thus determined.

When forming the phase impedance values, it is particularly advantageous to remove the system frequency components (for example 50 Hz components) from the phase real power variable P, from the phase wattless component variable Q and from the squared phase current amplitude variable I by means a least squares estimation method in each case. Such system frequency interference components would adversely affect the evaluation of the phase impedance values determined from these variables.

In order to explain the invention further, FIG. 1 shows a block diagram of an exemplary embodiment of the method according to the invention, FIG. 2 shows a block diagram for determining the phase impedance values, FIG. 3 shows the impulse response of the filters used for impedance determination, FIG. 4 shows the real power and wattless component variable profiles before filtering, and FIG. 5 shows the real power and wattless component variable profiles after filtering.

FIG. 1 shows, schematically, a method for determining the oscillation behavior of a three-phase electrical power supply system, by means of which a dedicated oscillation signal Pd1, Pd2 and Pd3 is produced for each phase in the power supply system. This is done by providing three changeover switches U1, U2 and U3 and three memory elements Sp1, Sp2 and Sp3; the connecting lines between the individual units in the layout are designed with three poles. The phase current and phase voltage sample values i and u of all three phases are supplied to a unit for impedance determination Ib, at whose output phase impedance values Z are output for the three phases. These phase impedance values Z are supplied via the changeover switches U1, U2 and U3 to an oscillation identification unit Pe. The oscillation identification unit Pe uses the time profiles of the phase impedance values Z to identify the occurrence of any oscillation in the individual phases, for example in phase 1, and emits an oscillation set signal Ps at its output for each phase in which oscillation is identified, for example for the phase 1. The oscillation set signal Ps sets the memory element associated with the respective phase, for example Sp1, and this memory element emits at its output the phase-specific oscillation signal, for example, Pd1. When an oscillation signal is being emitted, for example the oscillation signal Pd1, the changeover switch, for example U1, associated with the respective phase is switched over. The phase impedance values Z which are still formed for the phase in which the oscillation has been identified, for example the phase 1, are supplied to an oscillation signal resetting unit Pü. This oscillation signal resetting unit Pü identifies that the oscillation has stopped and, in this case, emits an oscillation reset signal Pr at its output, which resets the memory element for the respective phase, for example Sp1. The oscillation signal for the respective phase, for example Pd1, is thus also no longer emitted, and the respective changeover switch, for example U1, moves back to its original position once again. In response to a stimulus, a unit for phase selection Pa ensures that the phase impedance values of the phases to be investigated for oscillation are in each case processed by the oscillation identification unit Pe and by the oscillation signal resetting unit Pü.

The method of operation of the four units comprising impedance determination Ib, the oscillation identification unit Pe, the oscillation signal resetting unit Pü and phase selection Pa will be explained in more detail in the following text.

As shown in FIG. 2, the phase current and phase voltage sample values i and u are filtered in the impedance determination unit Ib by means of orthogonal FIR filters F1, F2, F3 and F4, thus resulting in the production of a variable U_re containing the real part of the phase voltage sample values, a variable U_im containing the imaginary part of the phase voltage sample values, a variable I_re containing the real part of the phase current sample values, and the variable I_im containing the imaginary part of the phase current sample values.

FIG. 3 shows the impulse responses of the filters F1 to F4, with the impulse response of the filters F1 and F3 which determine the real parts being annotated "o", and the impulse response of the filters F2 and F4 which determine the imaginary parts, being annotated "+".

As shown in FIG. 2, following this, a phase real power variable P is calculated in accordance with equation (1) below and a phase wattless component variable Q is calculated in accordance with equation (2) in the unit 5, and a squared phase current amplitude variable $I^2$ is calculated in accordance with equation (3) in the unit 6.

$$P = U\_re \cdot I\_re - U\_im \cdot I\_um \quad (1)$$

$$Q = U\_im \cdot I\_re + U\_im \cdot I\_re \quad (2)$$

$$I^2 = I\_re \cdot I\_re + I\_im \cdot I\_im \quad (3)$$

After this, the phase real power variable P, the phase wattless component variable Q and the squared phase current amplitude variable $I^2$ are filtered in units 7 and 8 in order to remove the interference 50 Hz components contained in these variables; this results in the filtered variables P', Q' and $I^{2'}$. The least squares estimation method used for this filtering will be explained in detail further below.

The upper illustration a) in FIG. 4 shows the profile of the real power variable P, and the lower illustration b) shows the profile of the Wattless component variable Q, before filtering by means of the least squares estimation method, in each case plotted against the time t.

The upper illustration a) in FIG. 5 shows the profile of the real power variable P', and the lower illustration b) shows the profile of the Wattless component variable Q', after filtering by means of the least squares estimation method; it can clearly be seen that the 50 Hz components have been removed.

As shown in FIG. 2, after the filtering in the unit 9, phase resistance values R and phase reactance values X are determined in accordance with equation (4), and the phase impedance values $Z=R+jX$ determined from them are emitted at the output of the impedance determination unit Ib.

$$R = P'/I^{2'} X = Q'/I^{2'} \quad (4)$$

A least squares estimation method using a signal model in accordance with equation (5) is applied separately to each of the variables P, Q and $I^2$ in order to filter out the 50 Hz components contained in the phase real power variable P, in the phase Wattless component variable Q and in the squared phase current amplitude variable $I^2$.

$$y_k = A \cdot e^{\frac{t}{\tau}} \cdot \sin(\omega_0 k \cdot T_A) + B \cdot e^{\frac{t}{\tau}} \cdot \cos(\omega_0 k \cdot T_A) + C \quad (5)$$

The estimation method uses the squared phase current amplitude variable $I^2$, the phase real power variable P and the phase Wattless component variable Q to calculate the parameters A, B and C in the signal model. The parameter C gives the sought magnitude of the phase real power variable P', of the phase Wattless component variable Q' and of the squared phase current amplitude variable $I^{2'}$. The summands with the parameters A and B model the 50 Hz components. The variable $\omega_0$ is the frequency (50 Hz) to be filtered out, and $T_A$ is the sampling time.

If an equivalent circuit with only two generator machines at the ends of a power transmission line is considered for the power supply system, the amplitude of the 50 Hz components decays with the time constants $\tau$ of the sum impedance between the two generator machines in accordance with equation (6), where L is the loop inductance and R is the loop resistance of the circuit which is closed via the two generator machines.

$$\tau = \frac{\sum L}{\sum R} \quad (6)$$

The coefficients A, B and C are determined such that the sum of the squares of the errors between values y determined from the phase current and phase voltage sample values i and u and the sample values yk calculated in accordance with equation (5) becomes a minimum (see equation (7)).

$$J = \sum_{i=k-N}^{k} (y_i - h(\underline{\Theta}_k))^2 \rightarrow \text{MIN} \quad (7)$$

In equation (7), J represents the Q-criterion to be minimized. The signal model included in equation (5) is used as the function $h(\underline{\Theta}_k)$. The parameters A, B and C to be determined form a vector H in accordance with equation (8).

$$\underline{\Theta}_k = \begin{pmatrix} A \\ B \\ C \end{pmatrix} \quad (8)$$

The Q-criterion J is derived based on the parameter vector $\underline{\Theta}_k$ in order to solve the minimization task. For the signal model in accordance with equation (5), this then results in equation (9) together with equation (10).

$$0 = \sum_{i=k-N}^{k} 2\underline{\gamma}_i^T (y_i - \underline{\gamma}_i \underline{\Theta}_k) \quad (9)$$

$$\underline{\gamma}_i^k = \frac{\partial h}{\partial \underline{\Theta}_k} \underline{\gamma}_i^k = \begin{pmatrix} \sin\left(\frac{2\pi}{T} iT_A\right) \cdot e^{-\frac{iT_A}{\tau}} \\ \cos\left(\frac{2\pi}{T} iT_A\right) \cdot e^{-\frac{iT_A}{\tau}} \\ 1 \end{pmatrix} \quad (10)$$

If equation (9) is solved for the vector $\underline{\Theta}_k$, then this results in equation (11), by means of which, and using the matrix $\underline{S}_k$ included in equations (12) and (13), the vector $\underline{\Theta}_k$ is determined.

$$\underline{\Theta}_k = \underline{S}_k^{-1} \sum_{i=k}^{k} \underline{\gamma}_i^T y_i \quad (11)$$

$$\underline{S}_k = \sum_{i=k-N}^{k} \underline{\gamma}_i^T \underline{\gamma}_i \quad (12)$$

$$\underline{S}_k = \quad (13)$$

$$\begin{pmatrix} \sin^2\left(\frac{2\pi}{T} iT_{A'}\right) \cdot e^{-\frac{iT_A}{\tau}} & \sin\left(\frac{2\pi}{T} iT_A\right)\cos\left(\frac{2\pi}{T} iT_A\right) \cdot e^{-\frac{iT_A}{\tau}} & \sin\left(\frac{2\pi}{T} iT_A\right) \cdot e^{-\frac{iT_A}{\tau}} \\ \cos\left(\frac{2\pi}{T} iT_A\right)\sin\left(\frac{2\pi}{T} iT_A\right) \cdot e^{-\frac{iT_A}{\tau}} & \cos^2\left(\frac{2\pi}{T} iT_A\right) \cdot e^{-\frac{iT_A}{\tau}} & \cos\left(\frac{2\pi}{T} iT_A\right) \cdot e^{-\frac{iT_A}{\tau}} \\ \sin\left(\frac{2\pi}{T} iT_A\right) \cdot e^{-\frac{iT_A}{\tau}} & \cos\left(\frac{2\pi}{T} iT'_A\right) \cdot e^{-\frac{iT_A}{\tau}} & 1 \end{pmatrix}$$

Of the parameters A, B and C contained in the vector $\underline{\Theta}_k$, only the parameter C is evaluated. The vectors $\underline{\gamma}_i^k$ in accordance with equation (10) and the matrix $\underline{S}_k$ in accordance with equation (13) are calculated and are stored as constants, so that they are available every time the method is used.

Monotony criteria are applied to the locus curves of the impedance values in the impedance plane in the oscillation identification unit Pe, in order to identify the oscillation process. This method for identification of the oscillation process is known per se, and is described in German Patent DE 197 46 719 C1.

The oscillation signal resetting unit Pü determines whether an oscillation which has already been identified is still continuing. The procedure used for this purpose comprises the production of an oscillation model for phase impedance values Z associated with the oscillation. A check is then carried out to determine whether the locus curve which is described by the newly determined phase impedance values Z still corresponds to the oscillation model. When producing the oscillation model, it is assumed that the locus curve is free of discontinuities, and that its direction changes only very slowly. In the present exemplary embodiment, the locus curve is described by a first order power function, that is to say by a linear equation, in accordance with equation (14).

$$X(R) = m \cdot R + X_0 \tag{14}$$

The parameters m and X0 are determined by means of a non-recursive least squares estimation method from the last N determined phase impedance values Z.

The linear equation is used as a model rule for the least squares estimation method, with the parameter m characterizing the gradient, and the parameter X0 characterizing the offset of the linear equation. The parameters m and X0 for the model in accordance with equation (14) are determined from the last determined value pairs (Ri, Xi) of the phase impedance values Zi such that the sum of the squares of the errors between the values Xi determined from the measured phase current and phase voltage sample values i and u and the values X calculated in accordance with equation (14) is a minimum (see equation (15)).

$$J = \sum_{i=k-N}^{k} (X_i - h(\Theta_k))^2 \to \text{MIN} \tag{15}$$

In equation (15), J is the Q-criterion to be minimized, the model rule in accordance with equation (14) is used as the function $h(\Theta_k)$. In accordance with equation (16), the parameter vector $\Theta_k$ contains the parameters m and X0, to be determined, from the model rule.

$$\underline{\Theta}_k = \begin{pmatrix} m \\ X_0 \end{pmatrix} \tag{16}$$

In order to solve the minimization task, the Q-criterion J must be derived on the basis of the parameter vector $\Theta_k$. The following equations (17) and (18) are then obtained for the signal model in accordance with equation (14):

$$0 = \sum_{i=k-N}^{k} 2\underline{\gamma}_i^T (X_i - h(\Theta_k)_i) \tag{17}$$

$$\underline{\gamma}_i^k = \frac{\partial h}{\partial \Theta_k} = \begin{pmatrix} R \\ 1 \end{pmatrix} \tag{18}$$

If equation (17) is solved for the parameter vector $\Theta_k$, then this results in equation (19) for determining the parameter vector $\Theta_k$.

$$\underline{\Theta}_k = S_k^{-1} \sum_{k=1}^{k} \underline{\gamma}_i^T y_i \tag{19}$$

where $$S_k = \sum_{i=k-N}^{k} \underline{\gamma}_i^T \underline{\gamma}_i \tag{20}$$

$$\underline{S}_k = \sum_{i=k-N}^{k} \begin{pmatrix} R_i^2 & R_i \\ R_i & 1 \end{pmatrix} \tag{21}$$

After substitution of the parameters in equation (14), this thus results in the estimated oscillation model. If a newly determined phase impedance value Z corresponds to the oscillation model, that is to say it is within a tolerance band around the linear equation represented by equation (14), then this identifies that the oscillation is continuing. If the newly determined phase impedance value z is outside the tolerance band, then this identifies that the oscillation has stopped, and an oscillation reset signal Pr is emitted at the output of the oscillation signal resetting unit Pü for the memory element Sp1, Sp2 or Sp3 for the respective phase.

The phase selection unit Pa receives a stimulus from, for example, a distance protection device which is not illustrated. Depending on the nature of the stimulated loop, it determines the phases for which the oscillation identification unit Pe and/or the oscillation signal resetting unit Pü should investigate the oscillation behavior. The following table shows the association between the stimulated loops and the phases.

| Stimulated loops | Phases to be investigated for oscillation behavior |
| --- | --- |
| L1E | L1 |
| L2E | L2 |
| L3E | L3 |
| L12 | L1 and L2 |
| L23 | L2 and L3 |
| L31 | L1 and L3 |

What is claimed is:

1. A method for producing at least one signal, which indicates an oscillation in an electrical power supply system, comprising:
   sampling a phase current and a phase voltage from at least one phase of the power supply system, forming phase current and phase voltage sample values;
   forming impedance values from the phase current and phase voltage sample values;
   monitoring the impedance values for an oscillation and, if an oscillation is identified, at least one memory element is set, and the oscillation signal is output;
   checking other impedance values to determine whether the oscillation is still continuing after setting the memory element; and
   resetting the memory element if the oscillation has stopped, wherein
   the check of the other impedance values uses an oscillation model which is formed from previous impedance values associated with the oscillation, or from variables which are dependent on the impedance values,
   a check is performed to determine whether other impedance values formed or a variable which is dependent on the other impedance values differ from the oscillation model, and
   an occurrence of other impedance values or of a variable dependent on the impedance values which differs from the oscillation model is assessed as the oscillation having stopped.

2. The method as claimed in claim 1, wherein the oscillation model is determined by means of a least squares estimation method.

3. The method as claimed in claim 2, wherein a function in the form $f(x)=ax^3+bx^2+cx+d$ with the parameters a, b, c and d, for which one or more parameters can be defined to be zero from the start, or
   a sum of decaying sinc and cosine functions is used as the model rule for the oscillation model.

4. The method as claimed in claim 1, wherein resistance values are used as the variable dependent on the impedance values.

5. The method as claimed in claim 1, wherein reactance values are used as the variable dependent on the impedance values.

6. The method as claimed in claim 1, wherein time derivative values of the impedance are used as the variable dependent on the impedance values.

7. The method as claimed in claim 1, wherein time derivative values of a resistance are used as the variable dependent on the impedance values.

8. The method as claimed in claim 1, wherein time derivative values of a reactance are used as the variable dependent on the impedance values.

9. The method as claimed in claim 1, wherein positive phase sequence system impedance values arc formed from the phase current and phase voltage sample values, and a common memory clement is provided, and a common oscillation signal is produced, for all the phases in the power supply system.

10. The method as claimed in claim 1, wherein phase impedance values are formed from the phase current and phase voltage sample values of each phase of the power supply system to be investigated for oscillation, and a dedicated memory clement is provided, and a dedicated oscillation signal is produced, for each of these phases.

11. The method as claimed in claim 10, wherein a variable $U\_re$ including the real part of the phase voltage sample, values, a variable $U\_im$ including the imaginary part of the phase voltage sample values, a variable $I\_re$ including the real part of the phase current sample values and a variable $I\_im$ including the imaginary part of the phase current sample values are formed from the phase current and phase voltage sample values for each phase,

- a phase real power variable P is determined from $P = U\_re \cdot I\_re - U\_im \cdot I\_im$,
- a phase Wattless component variable Q is determined from $Q = U\_im \cdot I\_re + U\_im \cdot I\_re$,
- a squared phase current amplitude variable $I^2$ is determined from $I^2 = I\_re \cdot I\_re + I\_im \cdot I\_im$,
- system-frequency components are removed by means of a least squares estimation method from the phase real power variable P, from the phase wattless component variable Q and from the squared phase current amplitude variable $I^2$, and
- phase resistance values R are determined from $R = P/I^2$ and phase reactance values X are determined from $X = Q/I^2$, and phase impedance values $Z = R + jX$ are thus determined.

* * * * *